(12) United States Patent
Knowles

(10) Patent No.: US 9,047,094 B2
(45) Date of Patent: Jun. 2, 2015

(54) APPARATUS AND METHOD FOR SEPARATE ASYMMETRIC CONTROL PROCESSING AND DATA PATH PROCESSING IN A DUAL PATH PROCESSOR

(75) Inventor: Simon Knowles, Bath (GB)

(73) Assignee: Icera Inc., Bristol (GB)

( * ) Notice: Subject to any disclaimer, the term of this patent is extended or adjusted under 35 U.S.C. 154(b) by 1861 days.

(21) Appl. No.: 10/813,615

(22) Filed: Mar. 31, 2004

(65) Prior Publication Data

US 2005/0223196 A1    Oct. 6, 2005

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC .......... *G06F 9/3885* (2013.01); *G06F 9/30032* (2013.01); *G06F 9/30036* (2013.01); *G06F 9/30127* (2013.01); *G06F 9/3013* (2013.01); *G06F 9/30181* (2013.01); *G06F 9/3853* (2013.01); *G06F 9/3887* (2013.01); *G06F 9/3891* (2013.01); *G06F 9/3897* (2013.01)

(58) Field of Classification Search
USPC ................................................ 712/1–9, 212
See application file for complete search history.

(56) References Cited

U.S. PATENT DOCUMENTS 5,423,051 A * 6/1995 Fuller et al. ..................... 712/7
5,600,801 A   2/1997 Parks et al.
5,600,810 A   2/1997 Ohkami (Continued)

FOREIGN PATENT DOCUMENTS

JP    H09212361 A    8/1997
JP    H11282674 A   10/1999

(Continued)

OTHER PUBLICATIONS

Bolotski, Michael et al. "Unifying FPGAs and SIMD Arrays." MIT: 1994.*
Stokes, Jon. "A Brief Look at the PowerPC 970." Ars technica: 2002. http://arstechnica.com/wankerdesk/3q02/powerpc.html May 11, 2006.*

(Continued)

*Primary Examiner* — George Giroux

(57) ABSTRACT

According to embodiments of the invention, there is disclosed a computer processor architecture; and in particular a computer processor, a method of operating the same, and a computer program product that makes use of an instruction set for the computer. In one embodiment according to the invention, there is provided a computer processor, the processor comprising: a decode unit for decoding instruction packets fetched from a memory holding a sequence of instruction packets; and first and second processing channels, each channel comprising a plurality of functional units, wherein the first processing channel is capable of performing control operations and comprises a control register file having a relatively narrower bit width, and the second processing channel is capable of performing data processing operations at least one input of which is a vector and comprises a data register file having a relatively wider bit width. The decode unit is operable to detect for each instruction packet whether the instruction packet defines (i) a plurality of control instructions to be executed sequentially on the first processing channel or (ii) a plurality of instructions comprising at least one data processing instruction to be executed simultaneously on the second execution channel, and to control the first and second channels in dependence on said detection.

18 Claims, 3 Drawing Sheets

(56) References Cited

U.S. PATENT DOCUMENTS

| | | | |
|---|---|---|---|
| 5,737,631 A | | 4/1998 | Trimberger |
| 5,922,065 A | * | 7/1999 | Hull et al. ............... 712/24 |
| 5,956,518 A | | 9/1999 | DeHon et al. |
| 5,968,167 A | | 10/1999 | Whittaker et al. |
| 6,061,367 A | | 5/2000 | Siemers |
| 6,292,845 B1 | | 9/2001 | Fleck et al. |
| 6,526,430 B1 | | 2/2003 | Hung et al. |
| 6,530,010 B1 | | 3/2003 | Hung et al. |
| 6,725,357 B1 | | 4/2004 | Cousin |
| RE38,679 E | | 12/2004 | Matsuo et al. |
| 6,880,150 B1 | | 4/2005 | Takayama et al. |
| 7,100,019 B2 | | 8/2006 | Norris et al. |
| 7,159,099 B2 | | 1/2007 | Lucas et al. |
| 7,234,042 B1 | | 6/2007 | Wilson |
| 2002/0010852 A1 | | 1/2002 | Arnold et al. |
| 2002/0063577 A1 | | 5/2002 | Abbott |
| 2002/0174266 A1 | | 11/2002 | Palem et al. |
| 2002/0198606 A1 | | 12/2002 | Satou |
| 2003/0154358 A1 | | 8/2003 | Seong et al. |
| 2004/0003206 A1 | | 1/2004 | May et al. |
| 2004/0054876 A1 | | 3/2004 | Grisenthwaite et al. |
| 2004/0117595 A1 | | 6/2004 | Norris et al. |
| 2004/0215593 A1 | * | 10/2004 | Sharangpani et al. ........ 707/1 |
| 2005/0044434 A1 | * | 2/2005 | Kahle et al. ............. 713/320 |
| 2005/0223193 A1 | | 10/2005 | Knowles |

FOREIGN PATENT DOCUMENTS

| | | | |
|---|---|---|---|
| JP | 2000509528 A | | 7/2000 |
| JP | 2001236496 A | | 8/2001 |
| JP | 2001306321 A | | 11/2001 |
| JP | 2003005958 A | | 1/2003 |
| JP | 2004217989 A | | 8/2004 |
| JP | 2005531848 A | | 10/2005 |

OTHER PUBLICATIONS

Hennessy, John and Patterson, David. "Computer Architecture: A Quantitative Approach". Unknown Edition, May 2003. pp. 127-130 and D-1 through D-14.*

Simonen, et al., "Variable-Length Instruction Compression for Area Minimization," IEEE, 2003.

Tanenbaum, "Structured Computer Organization," 1984, pp. 10-12, Prentice-Hall, Inc., Englewood Cliffs, NJ.

Beebe, et al., "Instruction sequencing control," IBM Technical Disclosure Bulletin, May 1972, pp. 3599-3611, vol. 14, No. 12.

Alippi, et al., "Determining the Optimum Extended Instruction-Set Architecture for Application Specific Reconfigurable VLIW CPUs," IEEE, 2001, pp. 50-56.

International Preliminary Report on Patentability issued in corresponding International Application No. PCT/GB2005/001069, Issued Oct. 4, 2006, together with the Written Opinion of the International Searching Authority.

Intel Corporation, "Intel Itanium Architecture Software Developer's Manual," vol. 1: Application Architecture, Revision 2.1, Oct. 2002, http://www.intel.co.jp/content/dam/www/public/ijkk/jp/ja/documents/developer/24531704_j.pdf, pp. 1:20, 1:32, 1:74, 1:169.

Ntel Corporation, "Intel Itanium Architecture Software Developer's Manual," vol. 3: Instruction Set Reference, Oct. 2002, http://www.intel.co.jp/content/dam/www/public/ijkk/jp/ja/documents/developer/24531904_j.pdf, pp. 3:169, 3:339.

McNairy, C., et al., "Itanium Processor Microarchitecture," IEEE Micro, IEEE Computer Society, vol. 23, Issue 2, Mar.-Apr. 2003, pp. 44-55.

Foreign Communication From a Related Counterpart Application, Japanese Application No. 2007-505614, Japanese Appeal No. 2013-8491 dated Nov. 12, 2013, 7 pages.

European Search Report; Oct. 21, 2009; 3 pages.

* cited by examiner

APPARATUS AND METHOD FOR SEPARATE ASYMMETRIC CONTROL PROCESSING AND DATA PATH PROCESSING IN A DUAL PATH PROCESSOR

TECHNICAL FIELD

This invention relates to a computer processor, a method of operating the same, and a computer program product comprising an instruction set for the computer.

BACKGROUND

In order to increase the speed of computer processors, prior art architectures have used dual execution paths for executing instructions. Dual execution path processors can operate according to a single instruction multiple data (SIMD) principle, using parallelism of operations to increase processor speed.

However, despite use of dual execution paths and SIMD processing, there is an ongoing need to increase processor speed. Typical dual execution path processors use two substantially identical channels, so that each channel handles both control code and datapath code. While known processors support a combination of 32-bit standard encoding and 16-bit "dense" encoding, such schemes suffer from several disadvantages, including a lack of semantic content in the few bits available in a 16-bit format.

Furthermore, conventional general purpose digital signal processors are not able to match application specific algorithms for many purposes, including performing specialized operations such as convolution, Fast Fourier Transforms, Trellis/Viterbi encoding, correlation, finite impulse response filtering, and other operations.

SUMMARY

In one embodiment according to the invention, there is provided a computer processor. The computer processor comprises: a decode unit for decoding instruction packets fetched from a memory holding a sequence of instruction packets; and first and second processing channels, each channel comprising a plurality of functional units, wherein the first processing channel is capable of performing control operations and comprises a control register file having a relatively narrower bit width, and the second processing channel is capable of performing data processing operations at least one input of which is a vector and comprises a data register file having a relatively wider bit width; wherein the decode unit is operable to detect for each instruction packet whether the instruction packet defines (i) a plurality of control instructions to be executed sequentially on the first processing channel or (ii) a plurality of instructions comprising at least one data processing instruction to be executed simultaneously on the second execution channel, and to control the first and second channels in dependence on said detection.

In further related embodiments, the first processing channel may further comprise a branch unit and a control execution unit. The second processing channel may further comprise a fixed data execution unit and a configurable data execution unit. The fixed data execution unit and the configurable data execution unit may both operate according to a single instruction multiple data format. The first and second processing channels may share a load store unit. The load store unit may use control information supplied by the first processing channel and data supplied by the second processing channel. The instruction packets may be all of equal bit length, such as a 64-bit length. The control instructions may be all of a bit length between 18 and 24 bits, such as a 21-bit length. The nature of each instruction in an instruction packet may be selected at least from a control instruction, a data instruction, and a memory access instruction. The bit length of each data instruction may be, for example, 34 bits; and the bit length of each memory access instruction may be, for example, 28 bits.

In further related embodiments, when the decode unit detects that the instruction packet defines three control instructions, the decode unit may be operable to supply the first processing channel with the three control instructions whereby the three control instructions are executed sequentially. Also, when the decode unit detects that the instruction packet defines two instructions comprising at least one data instruction, the decode unit may be operable to supply the second processing channel with at least the data instruction whereby the two instructions are executed simultaneously. The decode unit may be operable to read the values of a set of designated bits at predetermined bit locations in each instruction packet of the sequence, to determine: a) whether the instruction packet defines a plurality of control instructions or a plurality of instructions of which at least one is a data instruction; and b) where the instruction packet defines a plurality of instructions of which at least one is a data instruction, the nature of each of the two instructions selected from: a control instruction; a data instruction; and a memory access instruction. The configurable data execution unit may be capable of executing more than two consecutive operations on the data provided by a single issued instruction before returning a result to a destination register file.

In another embodiment according to the invention, there is provided a method of operating a computer processor which comprises first and second processing channels each comprising a plurality of functional units, wherein the first processing channel comprises a control register file having a relatively narrower bit width and the second processing channel comprises a data register file having a relatively wider bit width. The method comprises: decoding an instruction packet to detect whether the instruction packet defines a plurality of control instructions of equal length or two instructions comprising at least one data instruction, at least one of which is a vector; when the instruction packet defines a plurality of control instructions of equal length, supplying the control instructions to the first processing channel whereby the control instructions are executed sequentially; and when the instruction packet defines a plurality of instructions comprising at least one data instruction, supplying at least the data instruction to the second processing channel whereby the plurality of instructions are executed simultaneously.

In another embodiment according to the invention, there is provided a computer program product comprising program code means which include a sequence of instruction packets, said instruction packets including a first type of instruction packet comprising a plurality of control instructions of equal length and a second type of instruction packet comprising a plurality of instructions including at least one data instruction, wherein the computer program product is adapted to run on a computer such that the first type of instruction packet is executed by a dedicated control processing channel, and the at least one data instruction of the second instruction packet is executed by a dedicated data processing channel, the dedicated control processing channel having a relatively narrower bit width than the dedicated data processing channel.

In another embodiment according to the invention, there is provided a method of operating a computer processor which comprises first and second processing channels each comprising a plurality of functional units, wherein the first processing channel comprises a control register file having a relatively narrower bit width and the second processing channel comprises a data register file having a relatively wider bit width. The method comprises: fetching a sequence of instruction packets from a program memory, all of said instruction packets containing a set of designated bits at predetermined bit locations; decoding each instruction packet, said decoding step including reading the values of said designated bits to determine: a) whether the instruction packet defines a plurality of control instructions or a plurality of instructions of which at least one is a data instruction; and b) where the instruction packet defines a plurality of instructions of which at least one is a data instruction, the nature of each of the two instructions selected at least from: a control instruction; a data instruction; and a memory access instruction.

In another embodiment according to the invention, there is provided a computer program product comprising program code means which include a sequence of instruction packets, said instruction packets including a first type of instruction packet comprising a plurality of control instructions of substantially equal length and a second type of instruction packet comprising first and second instructions including at least one data instruction, said instruction packets including at least one indicator bit at a designated bit location within the instruction packet, wherein the computer program product is adapted to run on a computer such that said indication bit is adapted to cooperate with a decode unit of the computer to designate whether: a) the instruction packet defines a plurality of control instructions or a plurality of instructions of which at least one is a data instruction; and b) in the case when there is a plurality of instructions comprising at least one data instruction, the nature of each of the two instructions selected from: a control instruction; a data instruction; and a memory access instruction.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Figure 1:
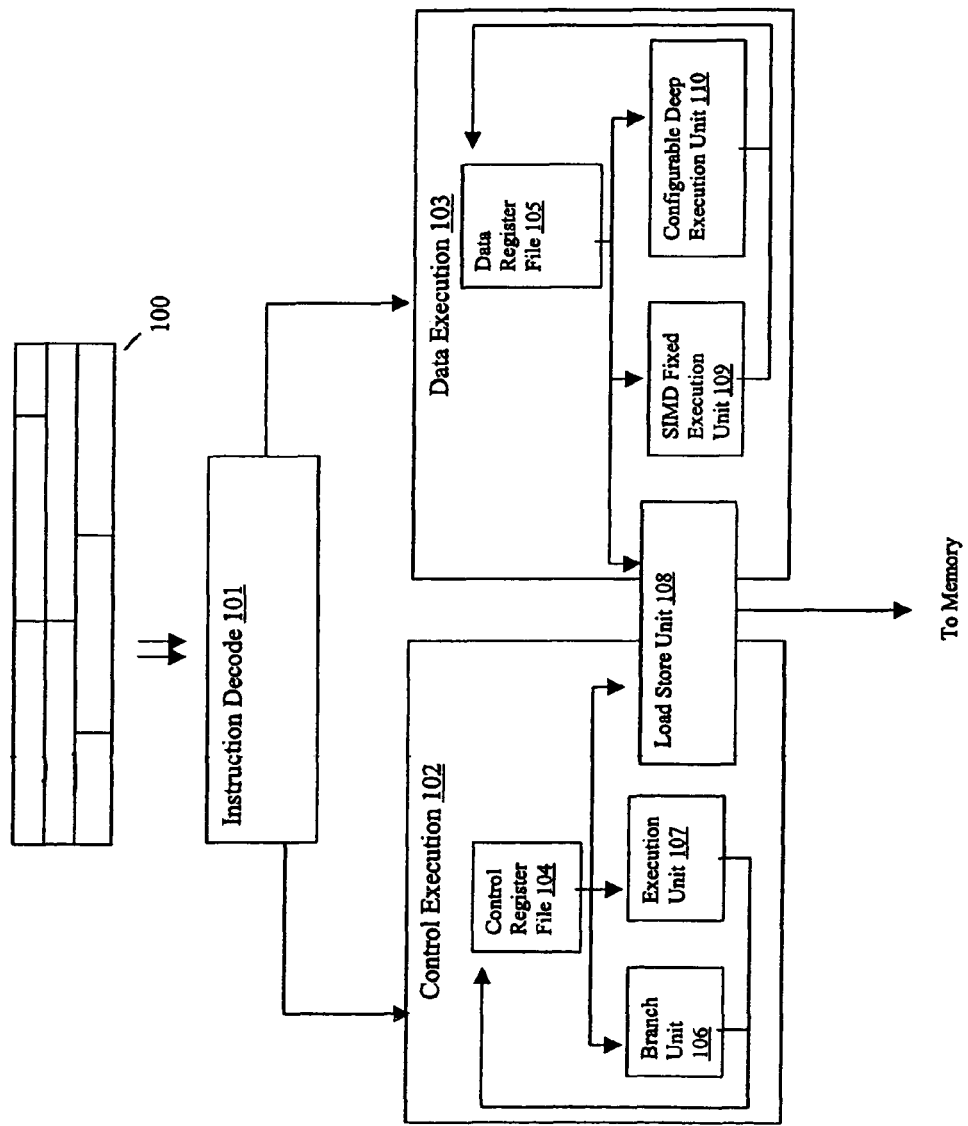
FIG. 1 is a block diagram of an asymmetric dual execution path computer processor, according to an embodiment of the invention.

FIG. 1 is a block diagram of an asymmetric dual path computer processor, according to an embodiment of the invention. The processor of FIG. 1 divides processing of a single instruction stream 100 between two different hardware execution paths: a control execution path 102, which is dedicated to processing control code, and a data execution path 103, which is dedicated to processing data code. The data widths, operators, and other characteristics of the two execution paths 102, 103 differ according to the different characteristics of control code and datapath code. Typically, control code favors fewer, narrower registers, is difficult to parallelize, is typically (but not exclusively) written in C code or another high-level language, and its code density is generally more important than its speed performance. By contrast, datapath code typically favors a large file of wide registers, is highly parallelizable, is written in assembly language, and its performance is more important than its code density. In the processor of FIG. 1, the two different execution paths 102 and 103 are dedicated to handling the two different types of code, with each side having its own architectural register file, such as control register file 104 and data register file 105, differentiated by width and number of registers; the control registers are of narrower width, by number of bits (in one example, 32-bits), and the data registers are of wider width (in one example, 64-bits). The processor is therefore asymmetric, in that its two execution paths are different bit-widths owing to the fact that they each perform different, specialised functions.

In the processor of FIG. 1, the instruction stream 100 is made up of a series of instruction packets. Each instruction packet supplied is decoded by an instruction decode unit 101, which separates control instructions from data instructions, as described further below. The control execution path 102 handles control-flow operations for the instruction stream, and manages the machine's state registers, using a branch unit 106, an execution unit 107, and a load store unit 108, which in this embodiment is shared with the data execution path 103. Only the control side of the processor need be visible to a compiler, such as a compiler for the C, C++, or Java language, or another high-level language compiler. Within the control side, the operation of branch unit 106 and execution unit 107 is in accordance with conventional processor design known to those of ordinary skill in the art.

The data execution path 103 employs SIMD (single instruction multiple data) parallelism, in both a fixed execution unit 109 and a configurable deep execution unit 110. As will be described further below, the configurable deep execution unit 110 provides a depth dimension of processing, to increase work per instruction, in addition to the width dimension used by conventional SIMD processors.

If the decoded instruction defines a control instruction it is applied to the appropriate functional unit on the control execution path of the machine (e.g. branch unit 106, execution unit 107, and load/store unit 108). If the decoded instruction defines an instruction with either a fixed or configurable data processing operation it is supplied to the data processing execution path. Within the data instruction part of the instruction packet designated bits indicate whether the instruction is a fixed or configurable data processing instruction, and in the case of a configurable instruction further designated bits define configuration information. In dependence on the sub-type of decoded data processing instruction, data is supplied to either the fixed or the configurable execution sub-paths of the data processing path of the machine.

Herein, "configurable" signifies the ability to select an operator configuration from amongst a plurality of predefined ("pseudo-static") operator configurations. A pseudo-static configuration of an operator is effective to cause an operator (i) to perform a certain type of operation or (ii) to be interconnected with associated elements in a certain manner or (iii) a combination of (i) or (ii) above. In practice, a selected pseudo-static configuration may determine the behavior and interconnectivity of many operator elements at a time. It can also control switching configurations associated with the data path. In a preferred embodiment, at least some of the plurality of pseudo-static operator configurations are selectable by an operation code portion of a data processing instruction, as will be illustrated further below. Also in accordance embodiments herein, a "configurable instruction" allows the performance of customized operations at the level of multibit values; for example, at the level of four or more bit multibit values, or at the level of words.

It is pointed out that both control and data processing instructions, performed on their respective different sides of the machine, can define memory access (load/store) and basic arithmetic operations. The inputs/operands for control operations may be supplied to/from the control register file 104, whereas the data/operands for data processing operations are supplied to/from the register file 105.

In accordance with an embodiment of the invention, at least one input of each data processing operation can be a vector. In this respect, the configurable operators and/or switching circuitry of the configurable data path can be regarded as configurable to perform vector operations by virtue of the nature of operation performed and/or interconnectivity therebetween. For example, a 64-bit vector input to a data processing operation may include four 16-bit scalar operands. Herein, a "vector" is an assembly of scalar operands. Vector arithmetic may be performed on a plurality of scalar operands, and may include steering, movement, and permutation of scalar elements. Not all operands of a vector operation need be vectors; for example, a vector operation may have both a scalar and at least one vector as inputs; 1 and output a result that is either a scalar or a vector.

Herein, "control instructions" include instructions dedicated to program flow, and branch and address generation; but not data processing. "Data processing instructions" include instructions for logical operations, or arithmetic operations for which at least one input is a vector. Data processing instructions may operate on multiple data instructions, for example in SIMD processing, or in processing wider, short vectors of data elements. The essential functions of control instructions and data instructions, just mentioned, do not overlap; however, a commonality is that both types of code have logic and scalar arithmetic capabilities.

Figure 2:
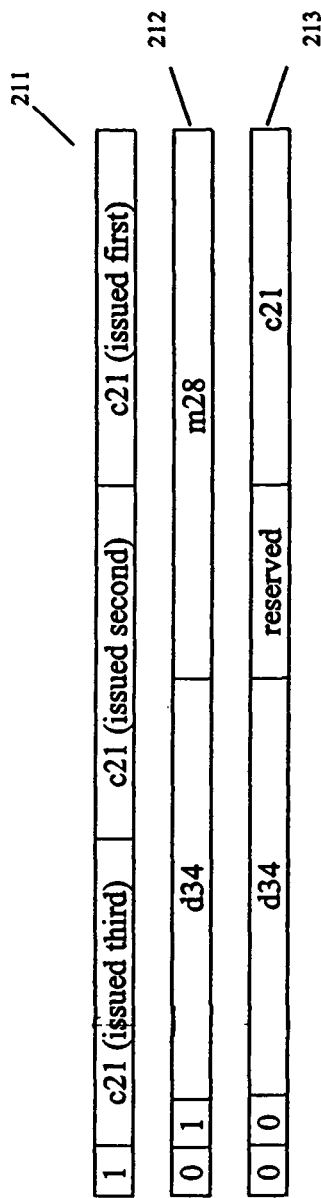
FIG. 2 shows exemplary classes of instructions for the processor of FIG. 1, according to an embodiment of the invention.

FIG. 2 shows three types of instruction packet for the processor of FIG. 1. Each type of instruction packet is 64-bits long. Instruction packet 211 is a 3-scalar type, for dense control code, and includes three 21-bit control instructions (c21). Instruction packets 212 and 213 are LIW (long instruction word) type, for parallel execution of datapath code. In this example each instruction packet 212, 213 includes two instructions but different numbers may be included if desired. Instruction packet 212 includes a 34-bit data instruction (d34) and a 28-bit memory instruction (m28); and is used for parallel execution of data-side arithmetic (the d34 instruction) with a data-side load-store operation (the m28 instruction). Memory-class instructions (m28) can be read from, or written to, either the control side or the data side of the processor, using addresses from the control side. Instruction packet 213 includes a 34-bit data instruction (d34) and a 21-bit control instruction (c21); and is used for parallel execution of data-side arithmetic (the d34 instruction) with a control-side operation (the c21 instruction), such as a control-side arithmetic, branching, or load-store operation.

Instruction decode unit 101 of the embodiment of FIG. 1 uses the initial identification bits, or some other designated identification bits at predetermined bit locations, of each instruction packet to determine which type of packet is being decoded. For example, as shown in FIG. 2, an initial indicator bit "1" signifies that an instruction packet is of a scalar control instruction type, with three control instructions; while initial indicator bits "0 1" and "0 0" signify instruction packets of type 212 and 213, with a data and memory instruction in packet 212 or a data and control instruction in packet 213. Having decoded the initial bits of each instruction packet, the decode unit 101 of FIG. 1 passes the instructions of each packet appropriately to either the control execution path 102 or the data execution path 103, according to the type of instruction packet.

In order to execute the instruction packets of FIG. 2, the instruction decode unit 101 of the processor of the embodiment of FIG. 1 fetches program packets from memory sequentially; and the program packets are executed sequentially. Within an instruction packet, the instructions of packet 211 are executed sequentially, with the 21-bit control instruction at the least significant end of the 64-bit word being executed first, then the next 21-bit control instruction, and then the 21-bit control instruction at the most-significant end. Within instruction packets 212 and 213, the instructions can be executed simultaneously (although this need not necessarily be the case, in embodiments according to the invention). Thus, in the program order of the processor of the embodiment of FIG. 1, the program packets are executed sequentially; but instructions within a packet can be executed either sequentially, for packet type 211, or simultaneously, for packet types 212 and 213. Below, instruction packets of types 212 and 213 are abbreviated as MD and CD-packets respectively (containing one memory and one data instruction; and one control instruction and one data instruction, respectively).

In using 21-bit control instructions, the embodiment of FIG. 1 overcomes a number of disadvantages found in processors having instructions of other lengths, and in particular processors that support a combination of 32-bit standard encoding for data instructions and 16-bit "dense" encoding for control code. In such dual 16/32-bit processors, there is a redundancy arising from the use of dual encodings for each instruction, or the use of two separate decoders with a means of switching between encoding schemes by branch, fetch address, or other means. This redundancy is removed by using a single 21-bit length for all control instructions, in accordance with an embodiment of the invention. Furthermore, use of 21-bit control instructions removes disadvantages arising from insufficient semantic content in a 16-bit "dense" encoding scheme. Because of insufficient semantic content, processors using a 16-bit scheme typically require some mix of design compromises, such as: use of two-operand destructive operations, with corresponding code bloat for copies; use of windowed access to a subset of the register file, with code bloat for spill/fill or window pointer manipulation; or frequent reversion to the 32-bit format, because not all operations can be expressed in the very few available opcode bits in a 16 bit format. These disadvantages are alleviated by use of 21-bit control instructions, in an embodiment of the invention.

A large variety of instructions may be used, in accordance with an embodiment of the invention. For example, instruction signatures may be any of the following, where C-format, M-format, and D-format signify control, memory access, and data format respectively:

| Instruction Signature | Arguments | Used By |
|---|---|---|
| instr | Instruction has no arguments | C-format only |
| instr dst | Instruction has a single destination argument | C-format only |

| Instruction Signature | Arguments | Used By |
|---|---|---|
| instr src0 | Instruction has a single source argument | C- or D-format only |
| instr dst, src0 | Instruction has single destination, single source argument | D- and M-format instructions |
| instr dst, src0, src1 | Instruction has a single destination argument and two source arguments | C-, D-, and M-format instructions |

Also in accordance with one embodiment of the invention, the C-format instructions all provide SISD (single instruction single data) operation, while the M-format and D-format instructions provide either SISD or SIMD operation. For example, control instructions may provide general arithmetic, comparison, and logical instructions; control flow instructions; memory loads and store instructions; and others. Data instructions may provide general arithmetic, shift, logical, and comparison instructions; shuffle, sort, byte extend, and permute instructions; linear feedback shift register instructions; and, via the configurable deep execution unit 110 (described further below), user-defined instructions. Memory instructions may provide memory loads and stores; copy selected data registers to control registers; copy broadcast control registers to data registers; and immediate to register instructions.

In accordance with an embodiment of the invention, the processor of FIG. 1 features a first, fixed data execution path and a second configurable data execution path. The first data path has a fixed SIMD execution unit split into lanes in a similar fashion to conventional SIMD processing designs. The second data path has a configurable deep execution unit 10. "Deep execution" refers to the ability of a processor to perform multiple consecutive operations on the data provided by a single issued instruction, before returning a result to the register file. One example of deep execution is found in the conventional MAC operation (multiply and accumulate), which performs two operations (a multiplication and an addition), on data from a single instruction, and therefore has a depth of order two. Deep execution may also be characterized by the number of operands input being equal to the number of results output; or, equivalently, the valency-in equals the valency-out. Thus, for example, a conventional two-operand addition, which has one result, is not an example of this type of deep execution, because the number of operands is not equal to the number of results; whereas convolution, Fast Fourier Transforms, Trellis/Viterbi encoding, correlators, finite impulse response filters, and other signal processing algorithms are examples of deep execution in accordance with preferred embodiments. Application-specific digital signal processing (DSP) algorithms do perform deep execution, typically at the bit level and in a memory-mapped fashion. However, conventional register-mapped general purpose DSP's do not perform deep execution, instead executing instructions at a depth of order two at most, in the MAC operation. By contrast, the processor of FIG. 1 provides a register-mapped general purpose processor that is capable of deep execution of dynamically configurable word-level instructions values at orders greater than two. In the processor of FIG. 1, the nature of the deep execution instruction (the graph of the mathematical function to be performed) can be adjusted/customised by configuration information in the instruction itself. In the preferred embodiment, data format instructions contain bit positions allocated to configuration information. To provide this capability, the deep execution unit 110 has configurable execution resources, which means that operator modes, interconnections, and constants can be uploaded to suit each application. Deep execution adds a depth dimension to the parallelism of execution, which is orthogonal to the width dimension offered by the earlier concepts of SIMD and LIW processing; it therefore represents an additional dimension for increasing work-per-instruction of a general purpose processor.

Figure 3:
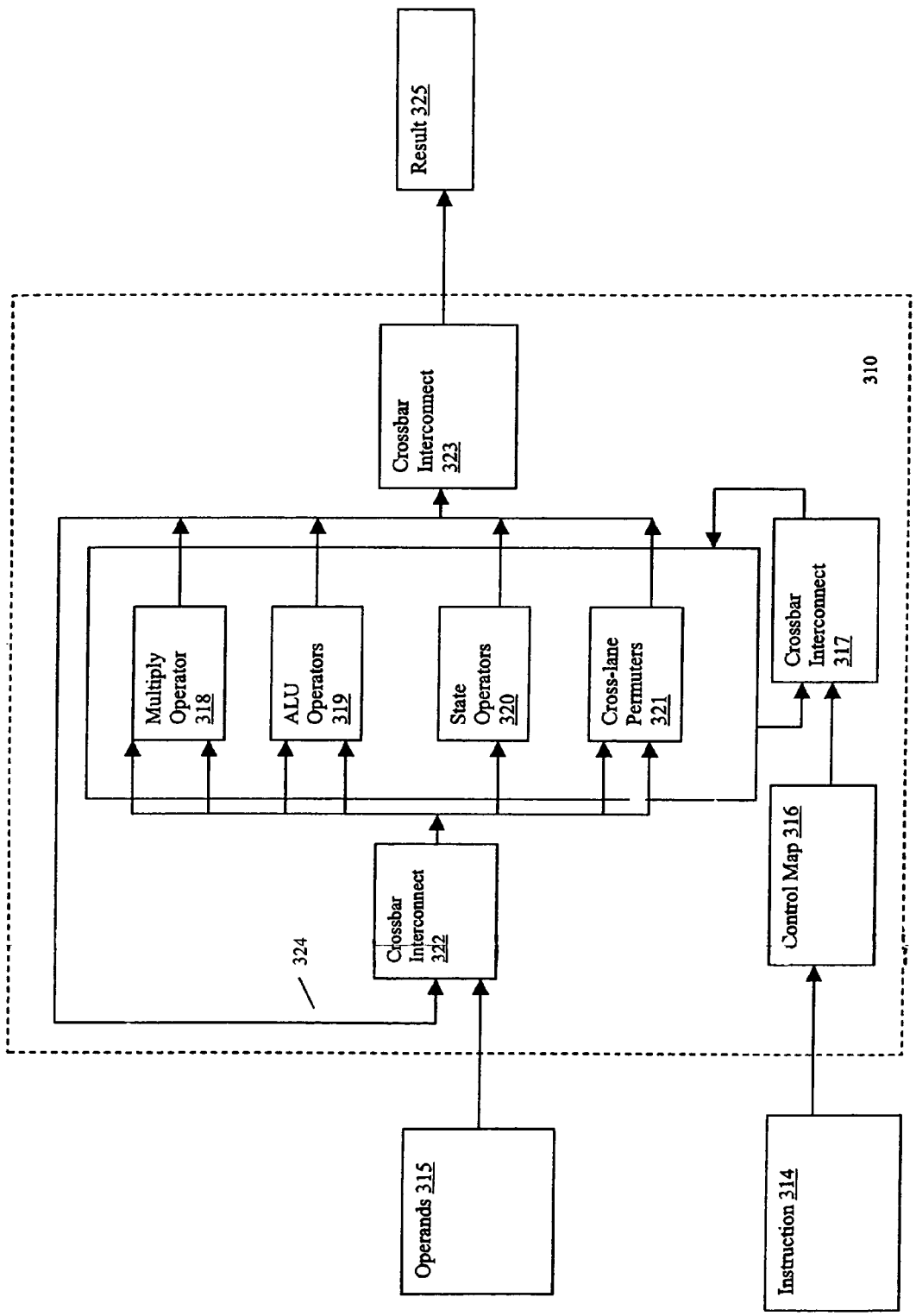
FIG. 3 is a schematic showing components of a configurable deep execution unit, in accordance with an embodiment of the invention.

FIG. 3 shows the components of an exemplary configurable deep execution unit 310, in accordance with an embodiment of the invention. As shown in FIG. 1, the configurable deep execution unit 110 is part of the data execution path 103, and may therefore be instructed by data-side instructions from the MD and CD-instruction packets 212 and 213 of FIG. 2. In FIG. 3, an instruction 314 and operands 315 are supplied to the deep execution unit 310 from instruction decode unit 101 and data register file 105 of FIG. 1. A multi-bit configuration code in the instruction 314 is used to access a control map 316, which expands the multi-bit code into a relatively complex set of configuration signals for configuring operators of the deep execution unit. The control map 316 may, for example, be embodied as a look-up table, in which different possible multi-bit codes of the instruction are mapped to different possible operator configurations of the deep execution unit. Based on the result of consulting the look-up table of the control map 316, a crossbar interconnect 317 configures a set of operators 318-321 in whatever arrangement is necessary to execute the operator configuration indicated by the multi-bit instruction code. The operators may include, for example, a multiply operator 318, an arithmetic logic unit (ALU) operator 319, a state operator 320, or a cross-lane permuter 321. In one embodiment, the deep execution unit contains fifteen operators: one multiply operator 318, eight ALU operators 319, four state operators 320, and two cross-lane permuters 321; although other numbers of operators are possible. The operands 315 supplied to the deep execution unit may be, for example, two 16-bit operands, four 8 bit operands on a single 32 bit operand; these are supplied to a second crossbar interconnect 322 which may supply the operands to appropriate operators 318-321. The second crossbar interconnect 322 also receives a feedback 324 of intermediate results from the operator 318-321, which may then in turn also be supplied to the appropriate operator 318-321 by the second crossbar interconnect 322. A third crossbar interconnect 323 multiplexes the results from the operators 318-321, and outputs a final result 325. Various control signals can be used to configure the operators; for example, control map 316 of the embodiment of FIG. 3 need not necessarily be embodied as a single look-up table, but may be embodied as a series of two or more cascaded look-up tables. An entry in the first look-up table could point from a given multi-bit instruction code to a second look-up table, thereby reducing the amount of storage required in each look-up table for complex operator configurations. For example, the first look-up table could be organized into libraries of configuration categories, so that multiple multi-bit instruction codes are grouped together in the first look-up table with each group pointing to a subsequent look-up table that provides specific configurations for each multi-bit code of the group.

In accordance with the embodiment of FIG. 3, the operators are advantageously pre-configured into various operator classes. In practice, this is achieved by a strategic level of hardwiring. An advantage of this approach is that it means fewer predefined configurations need to be stored, and the control circuitry can be simpler. For example, operators 318 are pre-configured to be in the class of multiply operators; operators 319 are pre-configured as ALU operators; operators 320 are pre-configured as state operators; and operators 321 are pre-configured as cross-lane permuters; and other pre-configured operator classes are possible. However, even though the classes of operators are pre-configured, there is run-time flexibility for instructions to be able to arrange at least: (i) connectivity of the operators within each class; (ii) connectivity with operators from the other classes; (iii) connectivity of any relevant switching means; for the final arrangement of a specific configuration for implementing a given algorithm.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of different implementations and modifications without departing from the inventive concepts. In particular, exemplary bit widths mentioned herein are not intended to be limiting, nor is the arbitrary selection of bit widths referred to as half words, words, long, etc.

What is claimed is:

1. A computer processor for processing (i) instruction packets comprising a plurality of only control instructions, the control instructions having a control bit width, and (ii) instruction packets comprising a plurality of instructions comprising at least one data processing instruction, the data processing instructions having a data processing bit width wider than the control bit width, the processor comprising:
    a decode unit for decoding sequentially the instruction packets fetched from a memory holding the instruction packets, the instruction packets being all of equal bit length;
    a control processing channel capable of performing control operations, the control processing channel comprising a plurality of functional units including a control register file having a first bit width; and
    a data processing channel capable of performing data processing operations at least one input of which is a vector, the data processing channel comprising a plurality of functional units including a data register file having a second bit width, wider than the first bit width;
    wherein the decode unit comprises decode circuitry configured to decode identification bits of each instruction packet to determine which type (i), (ii), of instruction packet is being decoded, and control circuitry configured to pass the plurality of only control instructions having the control bit width from an instruction packet of type (i) to the control processing channel when the decode circuitry indicates so and to pass the plurality of instructions comprising at least one data processing instruction having the data processing bit width wider than the control bit width from an instruction packet of type (ii) to the data processing channel when the decode circuitry indicates so;
    wherein, in use the decode unit causes instructions of (i) instruction packets comprising a plurality of only control instructions to be executed sequentially on the control processing channel; and
    wherein, in use the decode unit causes instructions of (ii) instruction packets comprising a plurality of instructions comprising at least one data processing instruction to be executed simultaneously on the data processing channel.

2. A computer processor according to claim 1, wherein the control processing channel further comprises a branch unit and a control execution unit.

3. A computer processor according to claim 1, wherein the data processing channel further comprises a fixed data execution unit and a configurable data execution unit.

4. A computer processor according to claim 3, wherein the fixed data execution unit and the configurable data execution unit both operate according to a single instruction multiple data format.

5. A computer processor according to claim 1, wherein the control and data processing channels share a load store unit.

6. A computer processor according to claim 5, wherein the load store unit uses control information supplied by the control processing channel and data supplied by the data processing channel.

7. A computer processor according to claim 1, wherein the instruction packets are all of a 64-bit length.

8. A computer processor according to claim 1, wherein the control instructions are all of a bit length between 18 and 24 bits.

9. A computer processor according to claim 8, wherein the control instructions are all of a 21-bit length.

10. A computer processor according to claim 1, wherein the nature of each instruction in an instruction packet is selected at least from a control instruction, a data instruction, and a memory access instruction.

11. A computer processor according to claim 10, wherein the bit length of each data instruction is 34 bits.

12. A computer processor according to claim 10, wherein the bit length of each memory access instruction is 28 bits.

13. A computer processor according to claim 1, wherein when the decode unit detects that the instruction packet defines three control instructions, the decode unit is operable to supply the control processing channel with the three control instructions whereby the three control instructions are executed sequentially.

14. A computer processor according to claim 1, wherein when the decode unit detects that the instruction packet defines two instructions comprising at least one data instruction, the decode unit is operable to supply the data processing channel with at least the data instruction whereby the two instructions are executed simultaneously.

15. A computer processor according to claim 1, wherein the decode unit is operable to read the values of a set of designated bits at predetermined bit locations in each instruction packet of the sequence, to determine:
    a) whether the instruction packet defines a plurality of control instructions or a plurality of instructions of which at least one is a data instruction; and
    b) where the instruction packet defines a plurality of instructions of which at least one is a data instruction, the nature of each of the two instructions selected from: a control instruction; a data instruction; and a memory access instruction.

16. A computer processor according to claim 3, wherein the configurable data execution unit is capable of executing more than two consecutive operations on the data provided by a single issued instruction before returning a result to a destination register file.

17. A method of operating a computer processor for processing (i) instruction packets comprising a plurality of only control instructions, the control instructions having a control bit width, and (ii) instruction packets comprising a plurality of instructions comprising at least one data processing instruction, the data processing instructions having a data processing bit width wider than the control bit width, the processor comprising a decode unit for decoding sequentially the instruction packets fetched from a memory holding the instruction packets, the instruction packets being all of equal bit length; a control processing channels comprising a plurality of functional units including a control register file having a first bit width; and a data processing channel capable of performing data processing operations at least one input of which is a vector, the data processing channel comprising a plurality of functional units including a data register file having a second bit width, wider than the first bit width, the method comprising:

decoding identification bits of each instruction packet to determine which type (i), (ii), of instruction packet is being decoded, and passing the plurality of only control instructions having the control bit width from an instruction packet of type (i) to the control processing channel when the decode circuitry indicates so and passing the plurality of instructions comprising at least one data processing instruction having the data processing bit width wider than the control bit width from an instruction packet of type (ii) to the data processing channel when the decode circuitry indicate so;

when the instruction packet defines (i) a plurality of only control instructions supplying the control instructions to the control processing channel wherein the control instructions are executed sequentially; and when the instruction packet defines (ii) a plurality of instructions comprising at least one data processing instruction, supplying at least the data instruction to the data processing channel wherein the plurality of instructions are executed simultaneously.

18. A non-transitory computer readable-medium comprising a sequence of instruction packets, the instruction packets being all of equal bit length, said instruction packets including a first type of instruction packet comprising a plurality of only control instructions of equal width, the control instructions having a control bit width, and a second type of instruction packet comprising a plurality of instructions comprising at least one data processing instruction, the at least one data processing instructions having a data processing bit width wider than the control bit width, and wherein at least one data processing instruction is a vector, said instruction packets including at least one indicator bit at a designated bit location within the instruction packet, wherein the computer readable-medium is adapted to run on a computer such that said indication bit is adapted to cooperate with a decode unit of the computer to designate whether:

a) the instruction packet defines a plurality of only control instructions having the control bit width or a plurality of instructions comprising at least one data processing instruction having the data processing bit width wider than the control bit width; and in the case when there is a plurality of instructions comprising at least one data instruction, the nature of each of the first and second instructions selected from: a control instruction; a data instruction; and a memory access instruction.

\* \* \* \* \*